Figure 1:
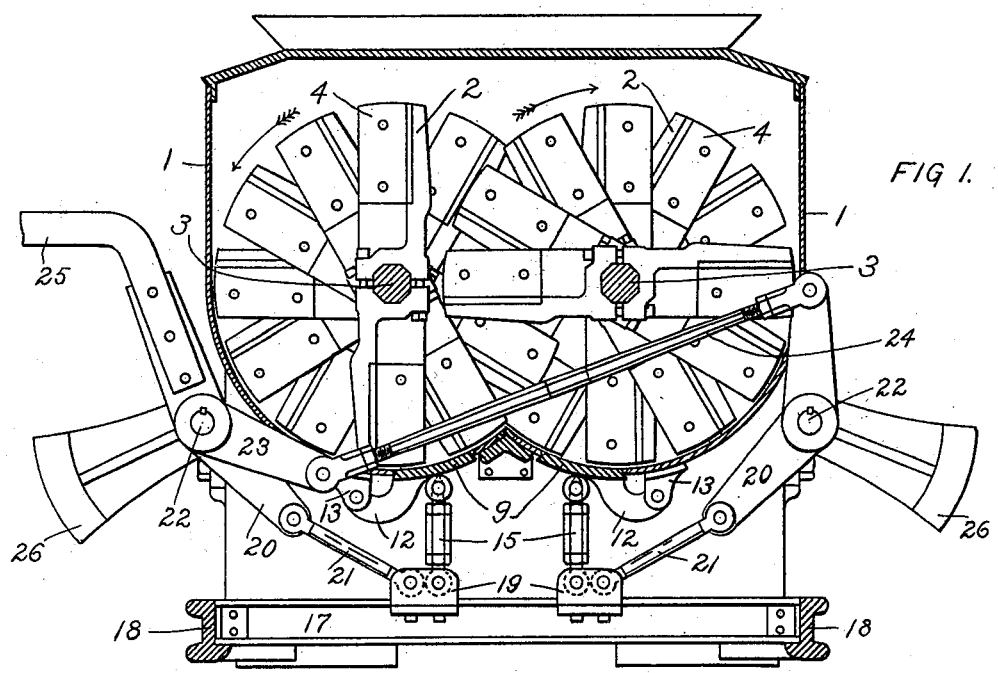

No. 618,535. Patented Jan. 31, 1899.
H. H. BUTLER.
MACHINE FOR MIXING ASPHALT.
(Application filed Oct. 22, 1897.)

(No Model.) 2 Sheets—Sheet 1.

WITNESSES
Percival Robert Moses
Louis J. Schroeder.

INVENTOR
Howard H. Butler
BY
Henry F. Noyes
ATTORNEY.

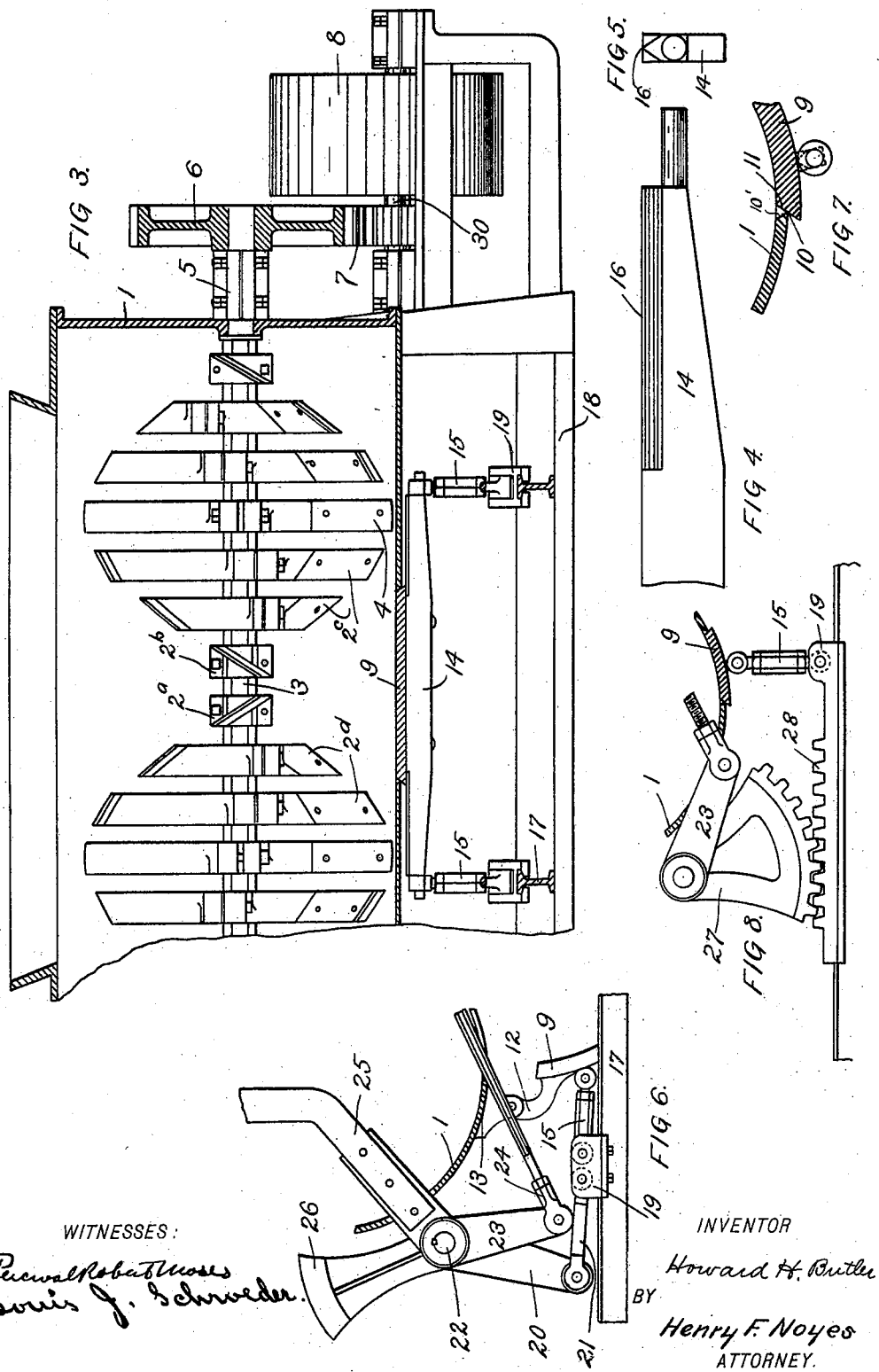

United States Patent Office.

HOWARD H. BUTLER, OF NEW YORK, N. Y., ASSIGNOR OF TWO-THIRDS TO LUCIUS A. ROCKWELL AND CHARLES S. FOWLER, OF SAME PLACE.

MACHINE FOR MIXING ASPHALT.

SPECIFICATION forming part of Letters Patent No. 618,535, dated January 31, 1899.

Application filed October 22, 1897. Serial No. 656,071. (No model.)

*To all whom it may concern:*

Be it known that I, HOWARD H. BUTLER, a citizen of the United States, and a resident of New York, in the county and State of New York, have invented certain new and useful Improvements in Machines for Mixing Asphalt and other Similar Substances, of which the following is a specification.

The life of asphalt pavement depends not only upon the relative proportions of its ingredients, but also upon the evenness with which they are distributed throughout the entire mass. Such a distribution is only obtained by a thorough agitation and stirring of the contents of the mixer when in a liquid condition.

It is usual to have the cart which receives the asphalt from the mixing-machine receive several charges to constitute a load, so that the cart remains under the machine while the several charges are being prepared and worked. It is therefore important that each charge shall be of the same relative proportions and consistency as the others.

In all previous machines trouble has been experienced with the opening and closing device which forms the means of controlling the discharge of the contents of the mixer. The mechanisms in most common use for this purpose are sliding plates of one form or another. These slides move back and forth on angle-irons fastened to the mixer. In order that the slides may move easily, there must be considerable clearance-space between them and the walls of the mixer, so that they may move freely in the grooves by which they are guided. When this clearance is sufficient to allow the slides to move easily at all times, they do not lie close enough to the walls of the mixer to prevent the contents thereof from occasionally leaking through and dripping upon the finished product waiting below, seriously affecting its quality, and frequently bad places in a pavement otherwise hard and good may be traced to these drippings of improperly-mixed material. If only a slight clearance exists, sand and asphalt more quickly work into the clearance-space and, hardening, cause the slides to move with great difficulty and necessitate that the grooves be regularly cleared out by hand, while in case there is too much clearance it is necessary to keep a man with a suitable receptacle beneath the opening in the mixer to catch the leakage.

The object of this invention is to provide a machine for mixing asphalt and other similar substances which contains within itself all the mechanisms necessary to effect the perfect and rapid intermixture of the ingredients and their clean and rapid discharge therefrom, so that the entire contents which are prepared for use are discharged into the cart and no unprepared or partly-prepared contents at any time allowed to escape.

To this end my invention consists in a mixing-machine provided with an opening having a self-cleaning closer so constructed and operated with relation to the adjoining wall of the mixer as to displace in closing any residual material which might otherwise prevent an absolutely-tight joint at the adjoining edges thereof and with mechanism for powerfully operating said closer to effect such displacement and with a mechanism which constantly agitates the ingredients into a thorough and complete association during the mixing process, whereby the contents of said machine are converted into a thoroughly-uniform mass.

One form of my improved machine is shown in the accompanying drawings, in which—

Figure 2:
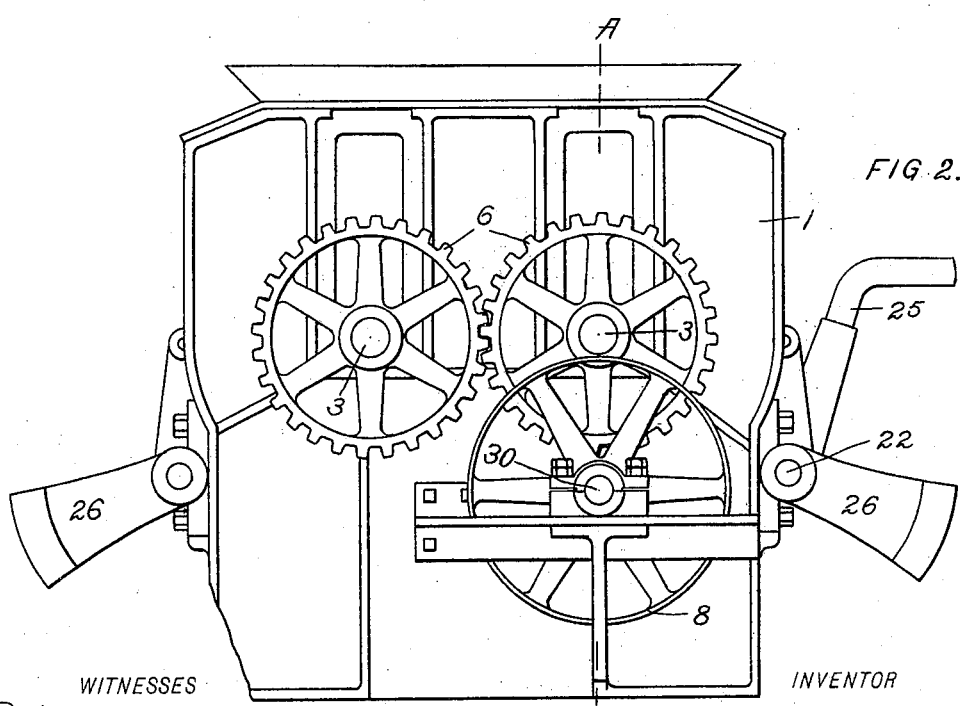

Figure 1 is an end elevation of the mixer, partly in section. Fig. 2 is an elevation taken from the opposite end from that shown in Fig. 1. Fig. 3 is a partial section taken on line A A of Fig. 2. Fig. 4 is a detail view of the bar which operates the closer. Fig. 5 is an end view of the same. Fig. 6 is a partial elevation showing the closer in its open position. Fig. 7 is an enlarged sectional view showing a portion of the closer in its closed position and in contact with the walls of the mixer. Fig. 8 is a partial elevation showing a slightly-different construction of the closer-operating mechanism.

Referring to the drawings, I provide a mixer shell or casing 1, made of suitable material and adapted to contain two sets of rotary blades 2. These sets of blades are firmly fastened and fitted, respectively, to two parallel shafts 3, each set arranged in pairs and at different angles about its shaft, so that the blades of one shaft will readily pass between and clear the blades upon the other shaft, and the casing is given such a cross-sectional outline at the sides and bottom thereof that there will be a slight clearance between its inner surfaces and the ends of the blades as they revolve. Disposed about midway between the ends of the casing and beneath each shaft is an opening provided with a closer 9.

The blades 2 are arranged in pairs upon opposite sides of the shaft and firmly bolted to it, each pair being disposed at an angle of approximately thirty degrees with the next pair on the same shaft and approximately perpendicular to the corresponding pair on the other shaft, so that when one pair of blades on one shaft stands in a vertical position the corresponding pair upon the other shaft lies approximately in a horizontal position, whereby the ends of each pair of blades as they revolve may just clear the hub of the corresponding pair of blades on the other shaft, sufficient clearance being allowed for them to freely pass between the two sets of blades which are disposed upon both sides of said corresponding pair of blades. The faces of the blades are inclined at an angle to their path of revolution, as shown by the end view of the blade $2^a$ in Fig. 3. The adjoining blade $2^b$ is inclined nearly at right angles to the blade $2^a$, and all the blades $2^c$ are inclined similarly to the blades $2^b$, while all the blades $2^d$ are inclined similarly to the blades $2^a$. The object of this construction is that the blades as they pass through the charge at the bottom of the mixer may gradually move the charge from the ends of the mixer toward the closer—a movement which results from the propeller-like action of the blades when they revolve in the direction indicated by the arrows in Fig. 1. In previous constructions these blades have been made with a convex face or of a cross-sectional outline similar to a flattened ellipse. Such a construction presents a blunt advancing portion of the blade, and instead of cutting through the charge and moving it all toward the closer a portion thereof is merely pushed around ahead of the blade and soon adheres to its blunt edge or else is merely lifted and dropped back in the same place.

It will be noted from an end view of the blade $2^a$ that its edges are parallel to its plane of revolution and that its faces are approximately straight and inclined thereto. This construction presents a sharp advancing or cutting edge, and the straight face of the blade allows it to clean itself as it passes through the charge. The blades might be given also a slightly-concave face to effect the same result.

Friction caused by the sand and portions of the charge which pass between the ends of the blades and the interior surfaces of the casing causes these ends to wear rapidly, especially when the material becomes chilled. Therefore these ends are preferably made of separable pieces 4, of hardened steel, whereby they last longer and may be more easily replaced when excessively worn.

The shafts 3 are supported in suitable bearings 5, and at one end of each shaft and meshing together are two heavy gear-wheels 6. Driving one of these gears is the smaller gear 7, driven by the pulley 8, which is supported by the shaft 30.

The walls of the casing around the opening to which is fitted the closer 9 are beveled off, forming an edge surface 10', which thus forms and surrounds the opening in the casing. This edge surface 10' also forms at its intersection with the outer surface of the casing an acute-angular edge or knife-edge 10. (See Fig. 7.) The closer is thicker than the shell and provided with contacting edge surfaces 11, beveled in an opposite direction to those of the casing, so that when the closer is shut its edge surfaces rest against and seat upon the knife-edges 10' of the casing and a slight clearance is left around the interior angular edges of the closer between them and the interior angular edges of the casing. The advantages of this construction are readily apparent. As the closer is moved to its closed position whatever portions of the charge have accumulated upon its edge surfaces and upon the angular edge of the casing are cut and scraped off by the closing movement of the closer until the edge surfaces 11 of the latter easily find a seat upon the knife-edges 10 of the casing and a tight joint is formed between these members. Each closer is provided with supporting lugs or arms 12, hinged to suitable brackets 13. A bar 14 is firmly fastened to the closer and supported at each end by adjustable turnbuckles 15. A certain portion of each bar, where each end extends beyond the closer, and upon the upper side of the bar, where it adjoins the outer surface of the casing when the closer is shut, is beveled to an angular or knife edge 16, as shown in Figs. 4 and 5. As these portions of the bar in its closing movement come into close proximity to the casing, the object of this construction is to enable the bar to cut into and separate any material which may accumulate upon the outer surface of the casing in the path of the bar where it would otherwise prevent the latter from approaching near enough to the casing to enable the closer to make a tight joint therewith.

Beneath the casing are two I-beams or tracks 17, (see Fig. 1,) suitably supported by the rails 18. Sliding upon these tracks are two sets of shoes 19, each set being connected with its corresponding closer by a pair of adjustable turnbuckles 15, making altogether four shoes and four turnbuckles. Each of the four shoes is also connected with one of the four arms 20 by a connecting-rod 21, and these arms are firmly fastened upon the shafts 22, there being two of these shafts, each carrying one pair of said arms 20. The shafts 22 are suitably supported in bearings at each end of the casing, and each shaft is provided with an arm 23, and these two arms are connected by a rod 24, provided at the ends thereof with a turnbuckle and right and left hand thread for adjustment. One of the shafts 22 is also provided with a lever 25, so that the operation of this lever operates both shafts and their connections simultaneously. Also fastened to the shafts 22 are the counterweights 26, which are adapted to hold the closers in their closed position and to counteract the weight of material which may be resting upon the closers when they are closed.

In the operation of the mixer it will be noted that in their closing movement the mechanisms act most advantageously for multiplying the power applied to the lever and for continually increasing the leverage as the closer approaches and until it reaches its seat, whereby a leverage is obtained which enables the closer to cut and clear away any residual material clogging its seat and acting to prevent the establishment of a tight joint therewith, and the stress caused by the weight of the closer when shut and of that portion of the charge which rests thereon is transmitted through the turnbuckles 15 directly to the supports 17, which are substantially constructed, so that they may meet this stress.

In Fig. 8 I have shown a slightly-different construction of details, in which the connecting-rod 21 and arm 20 are replaced by a segmental gear 27 and rack 28. The operation of the mechanism is similar to that shown in the previous construction, and the substitution of one or the other construction would depend chiefly upon the cost of manufacture.

It is evident that other construction might be given to the closer to enable it to seat itself by clearing away the obstructions of residual matter. For instance, the flat edge surfaces upon the casing might be beveled oppositely to the illustrated form and the knife-edges arranged upon the closer. I therefore do not wish to be limited to the precise construction shown, as in this and in other features of this invention I contemplate all proper changes of form, the omission of parts, and the substitution of equivalents as circumstances may suggest or necessity render expedient.

Thus will be seen the advantages of this invention. A self-cleaning closer is obtained which operates to cut and clear away all residual matter which would act to prevent the obtaining of a good joint with the casing.

The mechanism for operating the closer operates easily and powerfully and with increasing leverage as its work becomes more severe.

This machine may be successfully employed not only in the perfect mixing of asphalt, but also with equal facility to the mixing of mortar or, in fact, any mixable substance which is liable to rapidly harden from a liquid state and which requires to be frequently discharged from the machine.

I claim—

1. In a mixing-machine, in combination with a casing member provided with edge surfaces forming an opening into said casing, of a closer member for said opening also provided with edge surfaces; the edge surfaces of one of said members terminating in a knife-edge adapted to form a seat for the edge surfaces of the other member; and a means of operating said closer; as and for the purpose set forth.

2. In a mixing-machine, in combination with a casing provided with edge surfaces forming an opening into said casing and terminating in knife-edges; of a closer for said opening provided with adjoining edge surfaces, and adapted to seat upon said knife-edges; and a means of operating said closer; as and for the purpose set forth.

3. In a mixing-machine, the combination of a casing provided with a suitable opening; a closer for said opening; a bar fastened to said closer; a pair of shoes connected, one with each end of said bar; a rail adapted to support and guide each shoe; a pair of arms, each connected with one of said shoes; a shaft adapted to support and operate said pair of arms; and a means of operating said shaft.

4. In a mixing-machine, the combination of a casing provided with two openings; a closer for each opening; a bar fastened to each closer; a pair of sliding shoes connected with each bar one at each end thereof; rails adapted to support and guide said shoes; two shafts suitably supported in proximity to said casing; each shaft provided with a pair of arms and each arm connected with one of said shoes; connections between said shafts whereby they are adapted to operate in unison; and an operating-lever connected with one of said shafts.

5. In a mixing-machine, the combination of a casing provided with a suitable opening; a closer for said opening; a bar fastened to said closer and having a portion contiguous to said casing when said closer is shut; said contiguous portion being provided with an angular or knife edge; and suitable connections adapted to operate said bar; as and for the purpose set forth.

6. In a mixing-machine, in combination with a casing member provided with edge surfaces forming an opening therein, of a closer member for said opening also provided with edge surfaces; the edge surfaces of one member terminating in a knife-edge adapted to form a seat for the edge surfaces of the other member; and a means of operating said closer with a varying leverage thereby to force said closer and casing edge surfaces into close contact; as and for the purpose set forth.

7. In a mixing-machine, in combination with a casing member provided with edge surfaces forming an opening therein, of a closer member for said opening also provided with edge surfaces; the edge surfaces of one member terminating in a knife-edge adapted to form a seat for the edge surfaces of the other member; suitable supports disposed in proximity to said casing; a member adapted for sliding movement upon said support; connections between said sliding member and said closer; and a means of operating said sliding member thereby to operate said closer; as and for the purpose set forth.

HOWARD H. BUTLER.

Witnesses:
C. S. FOWLER,
WM. T. KENNEDY.